United States Patent [19]

Melcer et al.

[11] 4,054,679

[45] * Oct. 18, 1977

[54] STEAM INJECTION AND FLASH HEAT TREATMENT OF ISOELECTRIC SOY SLURRIES

[75] Inventors: Irving Melcer, Park Forest; Louis Sair, Evergreen Park, both of Ill.

[73] Assignee: The Griffith Laboratories, Inc., Alsip, Ill.

[*] Notice: The portion of the term of this patent subsequent to June 13, 1989, has been disclaimed.

[21] Appl. No.: 622,538

[22] Filed: Oct. 15, 1975

[51] Int. Cl.$^2$ .............................................. A23J 1/14
[52] U.S. Cl. ................................ 426/656; 426/658; 426/521; 426/661; 260/123.5
[58] Field of Search ............... 426/459, 520, 521, 634, 426/656, 615, 658, 671, 510, 511; 260/123.5

[56] References Cited

U.S. PATENT DOCUMENTS

| | | | |
|---|---|---|---|
| 2,881,076 | 4/1959 | Sair | 426/656 |
| 3,649,293 | 3/1972 | Hoer et al. | 426/431 |
| 3,669,677 | 6/1972 | Sair et al. | 426/431 |

*Primary Examiner*—R. B. Penland
*Attorney, Agent, or Firm*—Kegan, Kegan & Berkman

[57] ABSTRACT

A process for preparing a soy protein product having a high concentration of both solubilized carbohydrates and soluble protein, and being characterized by substantial freedom from bacterial activity, absence of objectionable beany flavor, light color, suitability for use in food preparations for human consumption, and enhanced palatability, wherein soybean material in the form of an aqueous slurry is first adjusted to an acid pH in the isoelectric range for the protein content of the material treated, or from about pH 3.5 to about pH 5.5, then subjected to steam injection to bring the temperature of the treated mass to the range of from about 225° to about 400° F, maintaining such temperature for a short time period, preferably from about 3 to about 30 seconds, to destroy viable bacteria and to solubilize carbohydrates. Residual steam is flashed, together with volatile constituents including objectionable flavor elements present in the soybean material. Thereafter, the pH of the hot steam-treated material is promptly adjusted upwardly to a value in the range of about pH 6 to about pH 10.5 to deter and to minimize protein denaturation. The end product, consisting of a viscous or semi-viscous dispersible fluid of milky appearance, may then be dried, as by spray drying, to provide a readily redispersible powder.

18 Claims, No Drawings

STEAM INJECTION AND FLASH HEAT TREATMENT OF ISOELECTRIC SOY SLURRIES

BACKGROUND OF THE INVENTION

The present invention relates to an improved method for producing soy protein products having a high concentration of both soluble protein and solubilized carbohydrate and being further characterized by freedom from activity of micro-organisms, absence of objectionable soybeam flavor, suitability for use in food preparations for human consumption, enhanced palatability, and ease of dispersibility and suspension stability in aqueous systems. The products produced in accordance with the invention are especially useful as adjuncts in food products, including meat products.

More particularly, the invention is directed to a method for treating aqueous slurries of soybeam material in accordance with a unique, unobvious, and most fruitful combination of controlled processing steps in which such parameters as pH, treatment temperature and time, neutralization steps, and cooling are precisely regulated so as to effectuate the aims and objects of the invention which will become apparent upon consideration of the following specification. In subject matter, the present invention is related to Sair and Melcer U.S. Pat. No. 3,699,677. The instant innvention is believed to constitute a significant improvement over the method there set forth. Because of its relevance, the entire disclosure of U.S. Pat. No. 3,699,677 is hereby specifically incorporated by reference, to the extent that it is not inconsistent herewith.

The above-identified U.S. Pat. No. 3,669,677 has as a principal goal the reduction of the bacterial count in proteinaceous materials derived from soybean sources. The process there set forth comprises raising the temperature of a slurry of defatted and water-extracted isoelectric (pH 4 to 5.5) soybean material up to at lest about 160° F and preferably up to about 180° or 190° to 212° F, holding the slurry at the elevated temperature for at least about 10 minutes, and then raising the pH of the slurry from an isoelectric pH to a pH of from about 6 to about 10.5. While the above described process has been found capable of providing a soybean protein product having a thermophile count of less than 300 per gram, and a total bacterial count of less than 25,000 per gram, there has been continued concern and interest in producing soy products having even lower concentrations of viable micro-organisms.

The instant invention stems from research carried out initially for the principal purpose of developing a soybean protein product substantially free of micro-organisms. It was in the conduct of the research referred to that several important unexpected and unobvious discoveries were made relating to improvements in the physical and chemical properties and in the composition of soybean-derived proteinaceous materials.

The bacterial content of goods and food ingredients is of special importance in our present society. For many of the foods being prepackaged, stability and safety in use are related directly to bacterial content. The problem of controlling bacteria in such foods has been one of long conern and many techniques have been proposed for accomplishing the intended goal. For example, Lloyd A. Hall U.S. Pat. No. 2,107,697 and U.S. Pat. No. Re.22,284 describe the utilization of a gas sterilization technique involving vacuum treatment of food materials followed by exposure to ethylene oxide. While this process was found to be extremely effective, other considerations preclude its general use. Another technique for controlling bacterial content involves application of dry heat. However, such processes are limited in utility.

In the wet processing of soybean materials, the potential for bacterial growth is a serious problem. In wet-milling of corn, sulfite has traditionally been used as an aid in controlling bacterial growth. But the end uses of soy concentrate and isolates, especially in meat applications preclude the use of substantial concentration of sulfite during wet processing.

In the manufacture of an isoelectric washed soy protein concentrate (see Sair U.S. Pat. No. 2,881,076), the soy flour is suspended in water and acid then added to a pH of 4.0, in the presence of a low concentration of sulfite. This produce is then dewatered, washed repeatedly, and finally neutralized and spray dried. In the commercial production, such processes must continue for days, during which time there is always the potential for bacterial build up.

A patent of Sair and Melcer, U.S. Pat. No. 3,699,677, details a procedure which more effectively reduces the bacterial content of a spray dried soy protein concentrate. Following the procedure there set forth, in order to obtain an effective bacterial kill, even in the isoelectric pH range (approximately pH 4.0 to 5.0), a temperature of at least 180° F is required. Even at this elevated temperature, with a 60-minute heating period, it was not possible to reduce the thermophiles to a value of less than 2 per gram. Only by raising the temperature to 200° F was it possible effectively to destroy the bacteria within a reasonable time. Moreover, the utilization of such a temperature in commercial operations, in accordance with the technique of U.S. Pat. No. 3,669,677 posed temperature-related difficulties due in part to proximity to the boiling state. The procedure was somewhat marginal, with sporadic results. Thermophiles were not always adequately destroyed. Moreover, at this high temperature, under the conditions set forth, nitrogen solubility of the protein component of the soy product was reduced. Such deficiencies are objectionable since a principal processing goal is to provide proteinaceous materials of high protein solubility, and associated good emulsion capabilities.

GENERAL DESCRIPTION OF THE INVENTION

The present invention overcomes the deficiencies and inadequacies of prior processes and procedures and constitutes an extremely simple technique whereby bacteria are more effectively destroyed while obviating the disadvantages inherent in the prior art methods. In its fundamental aspects, the substance of the present invention is the heating of a soybean material to a relatively high temperature, rapidly and for a short time through the use of steam injection, the heating being carried out at the isoelectric pH range of the proteinaceous material. Excess steam is flash vaporized to remove objectionable volatiles from the treated material. Then, without allowing excessive cooling, the pH of the slurry is promptly elevated to the rang of about 6 to about 10.5.

It was discovered that if, after the steam processing step the slurry is allowed to cool, and then neutralized, there is substantial protein denaturation. In accordance with the present invention, protein denaturation is avoided by neutralizing the slurry while still hot. It has been found that the steam treating step increases the concentration of soluble protein to a level in the range of about 60 to about 90% of the protein present and that neutralization of the product while hot preserves this desirable high nitrogen solubility.

It has also been discovered that conducting the steam sterilization at a pH in the isoelectric range of the protein produces a greater solubilization of carbohydrates than is possible at the higher or a lower pH. This solubility relates to better dispersibility and to enhanced suspension stability, properties which are most important in aqueous systems. In accordance with the present invention there is provided a concentrate or a soy flour with the desirable stability characteristics essentially equivalent to those of an isolate.

The use of pressurized steam at elevated temperatures in the treatment of soybeam material is, as a specific unit step, known in the prior art. However, there is no prior teaching or suggestion in the pertinent art of the particular process which constitutes the present invention. For example, Hawley et al U.S. Pat. No. 3,642,490 describes a process for treating isolated soy protein, which process includes heating at elevated temperatures by injecting steam under pressure. But, in the reference referred to, the steam heating step is carried out while the proteinaceous material is in a neutral pH range, from about 5.7 to 7.5. The same pH processing range is taught by Hawley et al U.S. Pat. No. 3,694,221. It is a critical element of the instant invention that the high temperature steam injection heating be carried out while the proteinaceous material is at the isoelectric pH range (pH 3.5 to pH 5.5).

Hoer et al U.S. Pat. No. 3,649,293, while utilizing a steam heating step, employs that step in a process involving the formation of a first and then a second slurry, each formed at a different pH, so that the overall process is markedly different from the process of the subject invention. The process of the reference is further distinguished from the process of the subject invention in a second critical step of the present invention which consists of neutralizing the steam-treated material while the latter is still hot. That is, the pH of the processed material is promptly raised to a value of from about 6 to about 10.5. No similar step is described or suggested in the above referred to patent.

Egger et al U.S. Pat. No. 3,849,391, while describing a protein processing method utilizing high temperature pressurized steam, teaches expressly that the heating be carried out "at a pH *other* than the isoelectric pH of the protein." (Emphasis added)

Thus, the novel process of the subject invention provides improved soy products having extraordinary high concentrations of both solubilized carbohydrates and soluble protein. The products are also substantially free of viable organisms. Additionally, enhanced viscosity, dispersibility and emulsification characteristics render the improved products most useful as components in food preparations for human consumption.

SUMMARY OF THE INVENTION

In accordance with the present invention there is provided a process for the treatment of a soybean material under controlled conditions of pH, heat, and neutralization to produce a soy protein product which is not only substantially free of viable organisms but also possesses a high concentration of both solubilized carbohydrate and soluble protein, and in which objectionable bitter or beany flavor has been eliminated so that the product is highly suitable for use in food preparations for human consumption.

The discovery which constitutes the present invention was made when, in a series of experiments, live steam was forcibly introduced, under pressure, into a slurry of soybean material in order to achieve a higher "sterilizing" temperature thereby more effectively to kill bacteria and other micro-organisms present in the soy product. It was found that by pumping an isoelectric soy curd through a conduit into which live steam was then injected to provide a temperature in the range of about 250°–350° F, the bacteria kill achieved in a 3 to 30-second treatment was markedly superior than what had previously been possible in even 15 minutes using a static atmospheric system such as described in U.S. Pat. No. 3,669,677. Surprisingly, it was then discovered that by carrying ot the steam injection sterilization step at the isoelectric pH of the protein material for a short processing time, the protein solubility of the final, treated composition was maintained high, or even increased provided that, immediately after the heat treatment and before substantial cooling the product was promptly neutralized. If the slurry is allowed to cool before neutralization, very substantial denaturation occurs, which is undesirable. A flash release of excess steam upon completion of the short processing period proved useful in that it carried with it and removed from the reaction system objectionable flavor and odor components which are ordinarily retined in processed proteinaceous soy material. While extremely short steam treatment times are preferred, longer periods of up to about 3 minutes duration may be used.

Other important and unexpected discoveries were made upon examination of the product resulting from the described treatment at the isoelectric point. The product itself exhibited markedly enhanced water dispersibility and suspension stability. It was found that in treating the slurry at the isoelectric pH the steam is far more effective in converting the insoluble carbohydrates to a soluble form than when the slurry is treated with steam at a higher or lower pH. Also, unexpectedly, it was found that by treating the slurry at te isoelectric pH range the viscosity of the soy product suspensions was greater than through treatment carried out at higher or at lower pH's. It will be appreciated by those skilled in the art that the described significant transformations and modifications of both the chemical and the physical properties of the treated material, are most important in adapting the fluid product of the invention, as well as its dry, powdered counterpart, for use in foods.

Reviewing generally the various steps in the process of the invention, the starting material is an isoelectric, water-washed slurry of defatted soy protein material such as soybean flour, flakes, or meal at a pH of 4–4.5, as described in Sair U.S. Pat. No. 2,881,076. The concentration of solids in the slurry is not critical and may vary widely in the range of from about 6 to about 30% but is preferably about 20%, the solids containing, for example, about 65–75% by weight protein. A slurry of soy flour, or washed curd may be used as the starting material.

It is a critical feature of the invention that, prior to steam injection, the aqueous protein slurry is at the isoelectric pH range of the protein content of the material being treated. For the particular preferred slurries described, this isoelectric range is from about pH 3.5 to about 5.5 (Generally, the preferred isoelectric pH for soybean protein is about 4.2.) In the preparation of the isoelectric water-washed slurry any edible acidic material may be added to the slurry, but a combination of hydrochloric acid with sodium bisulfite is preferred.

The heating of the isoelectric slurry is, in accordance with the present invention, carried out utilizing a steam injection technique. Pressurized steam at elevated temperatures is injected into the slurry contained in a confining vessel. The vessel itself may be either a pipe or tube or other conduit, or may be a pressure vessel such as an autoclave or a retort. Alternatively, devices known commercially as jet cookers may be used. Such reactors are commercially available and ordinarily include a pair of concentric nozzles or jet orifices through which the slurry and the pressurized steam are injected at high velocity so that the slurry is intimately and rapidly mixed with and heated by the steam to effect very rapid heat transfer and distribution. The structures of such processing vessels are known in the art. Accordingly, no detailed description is provided herein.

Pressurized steam, as, for example, at about 90–120 lbs. is introduced into the reaction vessel rapidly to elevate the temperature of the slurry contained therein to a temperature of about 350° F. The dwell time or slurry-steam interaction time is in the order of from about 3 to about 30 seconds depending on and being a function of such factors as solids concentration and slurry viscosity pumping rate, steam pressure, etc. While the 350° F temperature range is preferred to achieve all of the advantages of the invention, the operation may be carried out at lower temperatures as from about 225° to about 325° F, to realize some of the advantages of the invention, it being understood that at the lower temperatures it may be necessary to extend the contact or dwell time so as to obtain the desired conditions from a processing standpoint. At temperatures above 350° F, for example at 400° F, the process is accelerated, but greater care must be taken to avoid objectionable overheating in localized zones. The physical form and composition of the steam-treated product vary as a function of the processing time and temperature.

The heating step may be carried out as either a batch or a continuous process. In either case, upon the completion of the elected contact time, residual or excess steam is abruptly "flashed" or released from the vessel either into the ambient surroundings or into a special receiving or holding vessel. The released steam carries with it excess moisture as well as volatile constituents including objectionable flavor and ordor elements present in the soybean material, which elements, if retained in the ultimate product, would contribute undesirable taste and order properties. If desired, the vapor release may be directed into a container maintained at subatmospheric pressure. In all cases, separation of and removal of the released vapor from the slurry is effected substantially instantaneously so as to obviate recondensation into the product proper, with resulting contamination. Control discharge valves or such valves in combination with vacuum chambers or pumps may be used to ensure the desired ends.

A second critical feature in the process of the present invention is the treatment employed upon completion of the steam injection heating step. Specifically, undue cooling is avoided, and the slurry is immediately "neutralized" by raising the pH to a range of from about pH 6 to about pH 10.5. It hs been found that the rapid adjustment of the pH of the hot slurry from the isoelectric pH to the higher pH prevents protein denaturation. The neutralized reaction product may then be cooled and can form the base for milk-like substitutes. Alternatively, the material may be dried, as by spray drying, to provide a light-colored, finely divided, readily redispersible, particulate material.

The pH is raised or adjusted by adding any preferred edible alkali or buffering agent, for example, sodium carbonate, sodium bicarbonate, sodium hydroxide, disodium phosphate, trisodium phosphate, sodium tripolyphosphate, tetrasodium pyrophosphate, ammonium hydroxide, or mixtures thereof. The resulting, essentially dry, neutralized, soluble soy protein concentrate has a nitrogen solubility index (NSI) of at least 50 and, preferably, at least about 70.

The nitrogen solubility index (NSI) values expressed herein are based on the following general test procedure.

A 10-gm. aliquot of the sample to be tested in added to a Waring Blendor cup having 200 ml. of distilled water.

The blended slurry is transferred quantitatively to a 400 ml. beaker, using small rinses when needed. The pH of the transferred slurry is adjusted, if necessary, to a pH of 6.7 – 6.9 with 1 N NaOH or 1 N HCl. The suspension is then stirred for 15 minutes at slow speed with care so as to avoid creating a vortex action or stirring in air. The slurry is diluted to 500 ml. with distilled water.

A 250 ml. aliquot is centrifuged, using a 250 ml. cup, for 10 minutes at 2,500 r.p.m. (1600 × g).

A 50.0 ml. aliquot of supernatant free of suspended particles (if necessary, filter) is transferred to a Kjeldahl flask and the nitrogen content is determined by the Kjeldahl method. (A smaller aliquot may be used if the soluble nitrogen content is unusually high.)

The percent by weight of soluble nitrogen of the sample is calculated based on 1/10 of the weight of the material initially used, as follows:

$$NSI = \frac{\text{Soluble nitrogen}}{\text{Total Nitrogen}} \times 100\%$$

It is an important feature of the invention that its method facilitates the production of products having unusually high protein concentrations.

DESCRIPTION OF THE PREFERRED EMBODIMENTS

In the following paragraphs there are set forth data dealing directly with the process of the invention, with the parameters of that process, and with the properties and composition of the various products produced thereby. The descriptive and tabular material provided enhance an understanding of the invention, but should not be construed in any limiting way, the scope of the invention being defined in the appended claims.

In the various presentations, including the report of experimental work and the tabular summations of the results obtained, given data presented may pertain to only a specific facet of the invention. Accordingly, some of the tables reflect the effectiveness of the process in destroying bacteria and other micro-organisms. Others of the tables provide data establishing an enhancement of protein solubility, achieved in accordance with the invention. Still other data show the solubilization of carbohydrates achieved. Additional data relate to the improved dispersibility and suspension stability achieved for both the fluid and powdered products of the invention. Some presentations and tabular summaries are relevant to more than one of the above identified areas of interest, providing composites of data derived from a given set of tests or experiments. The following illustrative examples will facilitate a complete understanding of the invention.

EXAMPLE I

A series of processing runs was conducted to determine, for the steam injection treatment of isoelectric soy curd, the effect of slurry temperature on the appearance and on general physical properties of the resulting product. Isoelectric washed curd, diluted to a solids content of 17.5%, was treated with injection steam at 200°, 260°, and 350° F. The product obtained after treatment and cooling was examined visually for consistency and general appearance, and viscosity determinations were made. The data obtained are recorded in TABLE 1 below:

TABLE 1
EFFECT OF TEMPERATURE ON PHYSICAL PROPERTIES OF ISOELECTRIC SOY CURD

| Sample | Temperature in the Steam Jet System (Deg.F.) | Appearance of the Product after Leaving the Jet Cooker, and Cooling | Total Protein (Dry Basis) % | Viscosity, 10% Solids, pH 6.4; No. 2 Spindle, 30 rpm (cps) |
|---|---|---|---|---|
| 5 | Control | Typical Isoelectric slurry(17.5% solids) | 73.0 | 130 |
| 7 | 220 | Thick paste - no agglomeration, 15.5% solids | — | 330 |
| 6 | 260 | Agglomerated into small curds much like a cheese | — | 350 |
| 8 | 350 | White heavy paste. Looks quite different than other samples. | — | More than 10,000 |

It is evident that with higher temperatures the product exhibits increasingly greater viscosity, a very marked viscosity change occurring between 260° and 350° F. No "neutralization" step was carried out in this series of runs.

In comparing the dispersibility of the products obtained in the above-identified runs, it was found that a 5% suspension of the material from the 220° run, adjusted to a pH of 6.5 and agitated, settled substantially within a 10 minute period. In contrast, the product of the 350° F run (Sample 8), when similarly treated, gave a white milk-like suspension with no appreciable settling, even after 2 hours.

Similar tests carried out using an 18% solids slurry of soy flour instead of isoelectric washed soy curd gave results comparable to those set forth in TABLE 1.

EXAMPLE II

A quantitative determination was carried out to ascertain the degree of settling of high solids (30%) isoelectric soy slurries treated with pressurized steam at various temperatures. The results found for a temperature range from about 220° to 350° F are set forth in TABLE 2.

TABLE 2
EFFECT OF PROCESSING TEMPERATURE ON SUSPENSION STABILITY

| Test No. | Steam Injection Processing Temperature (° F) | ml. of clear supernatant after settling, in a 250 ml. graduate for 3 hours. |
|---|---|---|
| 10 | Control - isoelectric curd | 210 |
| 11 | 220 | 202 |
| 12 | 250 | 194 |
| 13 | 300 | 170 |
| 14 | 350 | O-stable chalk-like milky suspension. |

The treated slurries were diluted to 4% solids content and put into 250 ml. graduates to determine the degree of settling during a three-hour period. The data show that the higher the temperature of steam injection, the less the tendency for the suspension to separate. In each of the tests tabulated, the protein slurries were adjusted to a pH of 7.0 before blending (in a Waring blender). The most notable difference in the series of experiments is in the product treated at 300° F as compared with the 350° F treated product.

A similar experiment was carried out substituting soy flour for soy curd. The heating step was conducted at 350° F and a settling test established that the soy flour behaved similarly to the isoelectric curd.

EXAMPLE III

An aqueous slurry of defatted isoelectric washed soybean curd at a pH of 4.6 and containing 20.7% solids was prepared from defatted soybean flour. Three pounds of the slurry was introduced into a cylindrical container 12 inches long and 4 inches in diameter. The cylinder was fitted with a steam line at one end, a discharge valve at the other end, and a release valve, steam gauge, and dial thermometer along a side. Steam was then injected into the cylinder to a temperature of 250° F. (See TABLE 3), the total steam treatment time being 10 seconds. Thereafter, the discharge valve was opened, whereupon excess steam immediately flashed off and the sterilized slurry was deposited into a bucket-like receptable. TABLE 3 shows the effect of the sterilization treatment on the bacterial content of the final product, on the concentration of soluble carbohydrates and on the dispersibility of the heated slurry.

TABLE 3
Steam Injection Heating of Isoelectric Curd; Effect on Bacterial Content, Carbohydrate Solubilization and Dispersibility

|  | Isoelectric Slurry (Original) | Isoelectric Slurry (After Treatment) |
|---|---|---|
| Treatment Time | — | 10 secs. |
| Final Temperature in the Cylinder (° F) |  | 250 |
| pH | 4.6 | 4.6 |
| % Solids | 20.7 | 15.2 |

TABLE 3-continued

Steam Injection Heating of Isoelectric Curd; Effect on Bacterial Content, Carbohydrate Solubilization and Dispersibility

|  | Isoelectric Slurry (Original) | Isoelectric Slurry (After Treatment) |
|---|---|---|
| Total Carbohydrates, on a Dry Basis, % | 19.5 | 19.1 |
| % Soluble Carbohydrates, on a Dry Basis | 1.8 | 10.6 |
| Appearance of water phase* | Clear | Milky |
| Bacteriology (Dry Basis) | | |
| Total Bacteria/gm. | 222,200,000 | 2,000 |
| % Kill | — | 99.99 |
| Thermophiles/gm. | 38,600 | 33 |
| % Kill | — | 99.9 |
| Flat Sours/gm. | 320 | zero |
| % Kill | — | 100 |

*Appearance of a pH 4.2 centrifuged extract (2% solids), after centrifugation for 10 minutes at 2400 rpm In addition to rendering the reaction mixture substantially sterile, the high pressure steam injection was found effective to solubilize a high proportion of the carbohydrate components of the original soybean slurry. As indicated in TABLE 3, after a ten-second steam treatment the percent of soluble carbohydrates in the product, on a dry basis, increased from 1.8 to 10.6%. That is, the concentration of soluble carbohydrates increased from 9% of the total carbohydrates to 55.5%. It is believed that the marked increase in suspendability as shown by the milky supernatant after centrifugation is related to this transformation in composition.

Additional experimental work carried out under conditions set forth in TABLE 3 above, but utilizing a neutralized rather than an isoelectric curd, established that the same high degree of bacteria kill was achieved. This is, under the conditions of steam sterilization, the destruction of bacteria is independent of pH, as contrasted with the static system described in U.S. Pat. No. 3,669,677. Less than 5 seconds' treatment utilizing the steam injection process of the invention is exceedingly more effective in destroying bacteria than is 15 minutes of atmospheric heating.

EXAMPLE IV

A very important discovery was made when carrying out the work described above. It was found that the solubilization of carbohydrates was much greater in the isoelectric pH system than under neutral pH conditions. (See TABLE 4)

TABLE 4

Effect of pH on the Solubility of Carbohydrates by Steam Injection Treatment of Isoelectric and Neutralized Curd (at 250° F for 10 seconds)

|  | Isoelectric | Neutralized |
|---|---|---|
| pH | 4.6 | 6.8 |
| Percent Solids | 15.2 | 15.0 |
| Total Carbohydrates, on dry basis (%) | 19.1 | 19.7 |
| Percent Soluble Carbohydrates, on dry basis (originally) | 1.8 | 0.9 |
| Percent Soluble Carbohydrates, on dry basis. (after treatment) | 10.6 | 4.3 |
| Percent of Insoluble Carbohydrates Rendered Soluble | 50.9 | 18.1 |

For example, whereas the precent of insoluble carbohydrates rendered soluble for isoelectric curd treated with steam for 10 seconds was 50.9%, under the same conditions but starting with neutralized soy curd at a pH of 6.8, the percent of carbohydrates solubilized was only 18.1%. In appearance, a centrifuged extract of the final product changes from clear to milky with increased concentrations of solubilized carbohydrates.

EXAMPLE V

A series of experiments was carried out to determine whether the observed solubilization effects on carbohydrates in the case of isoelectric washed soy curd applied to soy flour also. Aqueous slurries of defatted soy flour (I-200, Staley Co.) were prepared in duplicate. One slurry was left at its native pH (6.7). Another was adjusted to an isoelectric pH (4.2), and a third to a pH of 3.0, with hydrochloric acid. A three-pound aliquot of each slurry was steam injected using the apparatus described above in Example III, a steam pressure of 100–110 psi for a 30-second period providing an internal processing temperature of 290° F. Each slurry was then flashed to atmosphere. The values obtained upon analysis of the starting soy flour, and the flashed slurries are given in TABLE 5.

TABLE 5

Effect of pH on the Solubilization of Carbohydrates by Steam Injection Treatment of Soy Flour (at 290° F for 30 seconds)

|  | Original Soy Flour | Steam Injection Treated at Following pH | | |
|---|---|---|---|---|
| pH | — | 3.0 | 4.3 (isoelectric) | 6.4 |
| Percent Solids | — | 11.2 | 11.8 | 14.4 |
| Total Carbohydrates, on dry basis (%) | 24.2 | 24.2 | 24.2 | 24.2 |
| Percent Soluble Carbohydrates, on dry basis (before treatment) | 11.2 | — | — | — |
| Percent Soluble Carbohydrates, on dry basis (after treatment) | — | 19.6 | 23.2 | 19.7 |
| Percent of Insoluble Carbohydrates Rendered Soluble | — | 64.6 | 92.3 | 65.4 |

In accordance with the invention it has been established that there are important differences between the products resulting from steam injection treatment of isoelectric pH soy flour slurries as compared with slurries treated at higher and at lower pH's. One difference is the marked increase in soluble carbohydrates in the isoelectric pH system. Based upon 13% of insoluble carbohydrate in the original soy flour, the percent of this insoluble material solubilized by the steam injection treatment was 92.3% for the soy flour treated at the isoelectric pH but only 65.4% for the neutral pH system, and only 64.6 for the acid pH system. These results are consistent with the results obtained using soy curd as the starting material.

The subject invention establishes a direct relationship between the increased carbohydrate solubilization achieved by the steam injection process and the viscosity of the resulting products. In TABLE 6 the viscosity of treated isoelectric washed soybean curd is tabulated as a function of processing conditions. For purposes of references and comparison, the first sample in the table is for heating at atmospheric pressure at a pH of 4.2, and at a temperature in the range of 180° F, in accordance with U.S. Pat. No. 3,669,677. The second sample is a slurry neutralized to a pH of 6.6 prior to steam injection. The third and fourth samples represent soy curd treated with pressurized steam, less and more vigorously, at the isoelectric pH (4.7) followed by hot neutralization to a pH of 6.6, and then spray dried. The two samples differ only in the extent of steam treatment. The viscosity data show the marked contrast between curd steam jet cooked at pH 4.7 and at pH of 6.6. Steam jet cooking of a neutralized curd will substantially increase product viscosity over the untreated material. But when the jet cooking occurs at the isoelectric pH, then there is a very marked increase in viscosity.

TABLE 6

Viscosity of Soy Protein Concentrates Subjected to Steam Injection Treatment

| Sample | pH and Conditions | Viscosity (cps) (8% solids) |
|---|---|---|
| GL-301 | pH 4.2, 180° F, atmos. pressure run | 12 |
| GL-301 LCF 27-94C | pH 6.6 | 470 |
| GL-301 LCF 34-14A | pH 4.7 (mild treatment) | 1,663 |
| GL-301 LCF 34-28 | pH 4.7 (vigorous treatment) | 15,600 |

EXAMPLE VI

The utility of the present invention for the solubilization of carbohydrates in soybean material makes possible the preparation of important new soy products which are soluble carbohydrate enriched. A rich fraction was prepared from soy flour which was then jet cooked at various pH levels. Such carbohydrate rich fractions were prepared by suspending soy flour in water and then extracting the soluble protein at a pH of 6.7. Approximately 60% of the total protein is soluble under these conditions, to yield a residue lower in protein content and much higher in carbohydrate content than the original soy flour. The water extracted insoluble carbohydrate-rich residue containing 34% total carbohydrates as contrasted to 25% in the soy flour itself, and 9.6% solids was then subjected to steam injection treatment for a 30-second reaction period to a final temperature of 295° F. Runs were carried out at three different pH's, 6.8, 4.2, and 3.0, and all resulting slurries were neutralized while hot. The effect of pH on the degree of solubilization of the carbohydrate is shown in TABLE 7.

Table 7

Solubilization of Carbohydrates in Carbohydrate-rich Soy Flour Fraction. Effect of pH on Steam Injection Processing

| Sample No. | Total Carbohydrate (%, Dry Basis) | pH of the Carbohydrate-Rich Slurry During Steam Injection | Soluble Carbohydrate after Treatment (%, Dry Basis) | Fraction of Insoluble Carbohydrate Rendered Soluble (%) |
|---|---|---|---|---|
| Untreated Slurry | 34.1 | — | 0.7 | 0 |
| 1 | 34.1 | 6.8 | 17.2 | 49.4 |
| 2 | 34.1 | 4.2 | 26.4 | 77.0 |
| 3 | 34.1 | 3.0 | 20.0 | 60.5 |

The soluble carbohydrate content of the carbohydrate-rich slurry is extremely low, since the bulk of the soluble carbohydrates was washed away from the material during extraction of the protein. Steam injection cooking converts the insoluble carbohydrate to a soluble form, this occurring to a much greater degree at a pH of 4.2 than at a pH which is higher or lower than the isoelectric range. Since greater carbohydrate solubilization contributes to better dispersibility and higher viscosity, the preferred steam jet cooking pH is the isoelectric point. The viscosity of the carbohydrate rich fraction increased more than tenfold when jet cooked at the isoelectric point.

EXAMPLE VII

It is an important feature of the present invention that improved soy products having not only increased concentrations of soluble carbohydrates but also products having significantly increased protein concentrations may be produced. The latter improvement was realized by first subjecting isoelectric soy flour slurries to the steam injection treatment so as to solubilize a significant fraction of the carbohydrates present. The steam processed slurry was then washed with water at the isoelectric pH to remove the solubilized carbohydrates (but not the proteinaceous material) leaving a residue proportionately enriched in protein. The final product obtained through this process has a protein concentration of about 79 percent, representing a commercially significant improvement over prior art washed soy protein concentrates such as described in Sair U.S. Pat. No. 2,881,076 and having only about 70% of protein (dry basis). The relevant analytical data are given in TABLE 8.

TABLE 8

High Protein Product from Isoelectric-Washed Steam-Injection-Treated Soy Flour

| | Soy Flour Treated by Steam Injection at Isoelectric pH. | Steam Processed Products, after Isoelectric Wash | |
|---|---|---|---|
| | Original | Cake | Washings |
| Solids(%) | 11.8 | 13.8 | 1.7 |
| Protein(d.b)(%) | 56.8 | 78.8 | 17.7 |
| Soluble Carbohydrates (%) | 23.2 | 1.2 | 50.1 |
| Recoveries(%) | | | |
| Solids | — | 59.7 | 39.5 |
| Protein | — | 82.9 | 12.3 |
| Soluble Carbohydrates | — | 3.1 | 85.6 |

The prior art has avoided steam injection of soy protein materials carried out at the isoelectric point. Rather, higher or lower pH zones have been specified. A desirable characteristic of soy protein material is the solubility of the contained protein. An important discovery of the present invention is that if one steam injects soy material at a neutral pH range, the slurry can stand for a substantial length of time, either hot or even with cooling followed by spray drying, and the spray dried product will have a high nitrogen solubility. It has also been discovered that, in contrast, if the steam injection is conducted on soy material at the isoelectric point, critical conditions can occur relating to denaturation. That is, in order to prevent denaturation it is essential that the hot slurry be immediately neutralized. If the hot steam-treated isoelectric slurry is allowed to drop in temperature, for example to 150° F or especially to 120° F or lower, before the neutralization is carried out, the final neutralized, cooled slurries have low nitrogen solubility.

By neutralizing the isoelectric steam injected hot slurry immediately, a spray dried product can be obtained with as high a nitrogen solubility as when steam processing is carried out at high pH's but yielding an improved product with the additional advantages of higher carbohydrate solubility and higher viscosity. Relevant data on nitrogen solubility index (NSI) appear in TABLE 9 below:

TABLE 9

| Experiment No. | Description of Test | Temperature of Slurry when Neutralized | NSI of Dried Product |
|---|---|---|---|
| 1 | Pilot plant steam injected isoelectric-washed curd; cooled to room temperature; batch neutralized and spray dried | 80° F | 10.2 |
| 2 | Same | 80° F | 21.0 |
| 3 | Neutralization, while hot, followed by spray drying | 160° F | 76.6 |
| 4 | Same as above except with continuous in-line neutralization | 180° F | 68.1–73.5 |
|   | Untreated soy flour (reference) | — | 71 |

In the first two tests recorded, the neutralization step was carried out after the steam sterilized product had cooled to room temperature, and relatively low NSI values were obtained for the dry powder product. In the second two tests, the neutralization was conducted while the material from the steam sterilization step was still hot. The first of the latter tests represents a batch neutralization operation, and the second test, a continuous, in-line neutralization. As contrasted with the NSI values of 10–20 for the "delayed" neutralization runs, the NSI value for the hot, promptly neutralized material, was in the range of 75.

While the precise mechanism responsible for the marked differences found in soluble protein as a function of neutralization techniques is not fully known, it is postulated that at the temperatures involved in the stream processing the soy proteins dissociate into sub-units (J. Food Sci., 38 320, 1973; ibid 40 537, 1975). Upon cooling at the isoelectric pH these sub-units recombine randomly into denatured (insoluble) protein. In contrast, upon prompt neutralization, so that the cooling occurs at neutral pH, the sub-units recombine to form only native (soluble) proteins.

Treatment of isolates (water extracts of soy flour followed by precipitation at the isoelectric point) with injection steam, followed by prompt hot neutralization gives products having high concentration of soluble protein, but not significantly increased as to viscosity, further supporting the belief that viscosity is related to carbohydrate solubilization.

EXAMPLE IX

A series of experiments was carried out which illustrates this newly discovered relationship between the temperature of neutralization and protein solubilization. It has been established that after stream jet processing followed by steam flashing to atmosphere the nitrogen solubility of the proteinaceous material (neutralized at 180° F) is not materially reduced as compared with the nitrogen solubility index of the starting material, as shown in TABLE 9 and in TABLE 10. In contrast, if the temperature of the steam injection processed slurry is allowed to drop below the 180° F flash temperature and then neutralized, the concentration of soluble protein is reduced. The data are set forth in TABLE 10, showing reduction in soluble protein concentration as the temperature decreases, a 10% decrease occurring at about 150° F and a decrease of over 50% occurring at about 85° F.

TABLE X

| Sample No.* | Temperature of the Jet Cooked Slurry at time of Neutralization | % Drop in Solubility of the Protein |
|---|---|---|
| 1 | 180° F | — |
| 2 | 150° F | 10% |
| 3 | 121° F | 24% |
| 4 | 85° F | 56% |

*Isoelectric soy flour slurry.

The effect is enhanced at the higher stream processing temperatures. The noted increase in aqueous dispersibility is also a function of increasing processing temperature.

The present invention establishes marked and unexpected advantages in processing soy-derived slurries at relatively high temperatures (225° and upward to about 400° F) as contrasted with atmospheric heating in the range of 180° to 210° F. In addition to lending itself to a very practical and economical continuous technique, the high temperature processing is time saving and much more effective in ensuring substantially 100% kill of bacteria and related micro-organisms. Processing periods in the range of about 3 seconds to about 30 seconds are completely adequate to provide substantially sterile products.

High temperature, pH controlled processing in accordance with the present invention also produces new and highly useful commercial products. Specifically, the products have markedly increased concentrations of soluble carbohydrates, and may be enhanced in protein content as well. Moreover, if as taught the isoelectric processed material is promptly neutralized, before cooling, the resulting products also have high nitrogen solubility indexes.

In addition to improved bacterial kill, and significantly modified and improved chemical compositions, the products of the invention are characterized by viscosities higher than those ordinarily heretofore obtained. The viscosities may also be controllably adjusted by selection of particular processing temperature, as taught herein. The fluid products of the invention are readily dispersible in aqueous systems and the dried powders of the invention are redispersible to provide highly stable suspension systems whose properties suggest many attractive commercial applications.

What is claimed is:

1. In the method of treating a soybean material to provide a soy product, said method including the steps of forming an aqueous slurry of soybean material and processing said slurry under controlled conditions of time, temperature and pH to destroy bacteria, to mofify the physical and the chemical properties of the slurry and to improve the flavor properties thereof, the improvement wherein the processing of said slurry comprises the steps of:

adjusting the pH of an aqueous slurry of soybean material to an isoelectric pH value characteristic of the protein being treated, said value being in the range of from about pH 3.5 to about pH 5.5, injecting pressurized steam into said slurry to provide a rapid rise in temperature of from about 225° to about 400° F while said slurry is contained in a confining vessel, maintaining a short dweel time of contact of said slurry with said pressurized steam in said vessel, said time being preferable of from about 3 seconds to about 3 minutes, duration, and, while the steam-treated slurry is at a temperature of at least 160° F; promptly elevating the pH of the slurry to a value in the range of from about 6 to about 10.5 to minimize denaturation of proteins contained in the slurry, and recovering a homogeneous, readily dispersible water miscible fluid product containing both solubilized carbohydrates and soluble protein, said fluid product being further characterized by absence of bacterial activity, substantial freedom from objectionable beany flavor and ordor, particular suitability for use in food products for human consumption, and enhanced palatability.

2. The method as set forth in claim 1 and further comprising the step of drying the fluid product derived from the steam processed and neutralized slurry to provide an essentially dry soy protein powder, light in color, of bland flavor, and having excellent redispersibility.

3. The method as set forth in claim 2 wherein the drying step is carried out by spray drying the steam treated and neutralized fluid product.

4. A dry soy protein powder produced in accordance with the method of claim 2, and characterized by a high degree of redispersibility in aqueous systems.

5. A soy flour produced in accordance with the method of claim 2 and characterized by a nitrogen solubility index (NSI) in excess of about 50, and soluble carbohydrates in excess of about 67% by weight of the total carbohydrates present.

6. The method as set forth in claim 1 wherein steam is injected into said slurry to provide a temperature of from about 300° to about 350° F.

7. The method as set forth in claim 1 wherein the aqueous slurry of soy material is formulated with a solids concentration of from about 15 to about 25% by weight prior to steam treatment.

8. The method as set forth in claim 1 wherein the slurry is adjusted to a pH in the range of about 4.2 to 4.5 prior to injection of stream thereinto.

9. The method as set forth in claim 1 wherein the steam treated material is neutralized to a pH in the range of from 6.5 to 7.5.

10. The method as set forth in claim 1, wherein injection of steam into the slurry is carried out through a restricted passage while said slurry is contained in a confining vessel.

11. The method as set forth in claim 1 wherein the soybean material is soy curd.

12. The method as set forth in claim 1 wherein the soybean material is soy flour.

13. A fluid product produced in accordance with the method of claim 1.

14. The method as set forth in claim 1 and further comprising the steps of maintaining said slurry at an elevated temperature after steam treatment and prior to elevating the pH thereof, centrifuging and washing said slurry while hot, thereby to remove soluble constituents of said slurry to provide a high protein product having a protein concentration in excess of about 75% by weight as calculated on a dry basis.

15. A dry soy protein concentrate produced in accordance with the method of claim 14 and characterized by a nitrogen solubility index (NSI) in excess of about 50, and soluble carbohydrates in excess of about 50% by weight of the total carbohydrates present.

16. A soy protein concentrate produced in accordance with claim 14 from which a slurry is prepared having 8% solids and having a viscosity in excess of about 500 cps.

17. A soy protein concentrate produced in accordance with claim 14 from which a slurry is prepared 8% solids and having a viscosity in excess of about 1000 cps.

18. A soy protein product made in accordance with the method of claim 14.

* * * * *